United States Patent [19]

Merchant, Jr. et al.

[11] 4,407,706
[45] Oct. 4, 1983

[54] PROCESS FOR DEDUSTING SOLIDS-CONTAINING HYDROCARBON OILS

[75] Inventors: Philip Merchant, Jr., Houston, Tex.; Dean L. Smith, Jr., Mountainside, N.J.

[73] Assignee: Exxon Research and Engineering Co., Florham Park, N.J.

[21] Appl. No.: 295,797

[22] Filed: Aug. 24, 1981

[51] Int. Cl.$^3$ .............................................. B01D 17/06
[52] U.S. Cl. ................................... 204/190; 208/188; 210/708; 210/748
[58] Field of Search ............... 204/190, 302; 208/177, 208/188, 251 R; 210/708, 748, 749; 252/331, 332, 340, 353, 356, 358, 339

[56] References Cited

U.S. PATENT DOCUMENTS

| | | | |
|---|---|---|---|
| 2,387,250 | 10/1945 | Eddy | 204/190 |
| 2,552,528 | 5/1951 | De Groote | 252/331 |
| 2,828,266 | 3/1958 | De Groote et al. | 252/332 |
| 2,914,484 | 11/1959 | Monson et al. | 252/331 |
| 2,945,818 | 7/1960 | Costine et al. | 252/353 |
| 2,950,272 | 8/1960 | Kirkpatrick | 252/340 |
| 3,640,894 | 2/1972 | Sampson | 252/358 |
| 4,083,698 | 4/1978 | Wenzel et al. | 252/356 |
| 4,299,690 | 11/1981 | Allan | 208/188 |

OTHER PUBLICATIONS

Griffen, "Non-Ionic Surfactants," *The American Perfumer*, May 1955, pp. 26–29.

*Primary Examiner*—Peter A. Hruskoci
*Attorney, Agent, or Firm*—Llewellyn A. Proctor

[57] ABSTRACT

Very finely divided particulate solids are removed from unconventional whole heavy petroleum crudes, heavy petroleum crude fractions, and residua, syncrudes and syncrude fractions, particularly shale oil and shale oil fractions, by the use of novel surface active agents. The surface active agent is characterized as an admixture of (I) a surfactant comprised of (A) an ethoxylated or propoxylated ester, or ester constituted of a 1,4 sorbitan skeleton to which at least one and up to three ethoxy, propoxy, or mixed ethoxy-propoxy, and at least one and up to three fatty acid substitutents are attached through oxygen to the 2,3,5 and 6 carbon atoms; and preferably this compound (A), or mixture thereof, is further admixed with (B) an organo sulfonic acid; and more preferably an admixture of (B) an organo sulfonic acid and (C) an ammonium ion substituted, a substituted ammonium ion substituted, or alkali metal substituted sulfonate. In its more preferred form, the surfactant (I) is admixed with (II) a demulsifier which is characterized as an ethoxylated, propoxylated, or mixed ethoxylated/propoxylated phenol formaldehyde resin substituted at a position para to said ethoxy and/or propoxy group, or groups, with a hydrocarboyl group. The surface active agent is admixed with the solids-containing oil, the mixture is emulsified with water, and heated, the novel surface active agent causing transfer of solids to the aqueous phase. The emulsion is contacted in an electrostatic coaleser to coalesce the water and separate from the emulsion and water phases a clean oil product for use in refining operations.

41 Claims, 2 Drawing Figures

PROCESS FOR DEDUSTING SOLIDS-CONTAINING HYDROCARBON OILS

BACKGROUND OF THE INVENTION AND PRIOR ART

The dwindling supplies of high grade petroleum feedstocks necessitates the increased production and processing of transportation fuels from lower grade, heavy petroleum feedstocks and synthetic liquid hydrocarbons derived from hydrocarbon-containing, or precursor hydrocarbon-containing, solids. It has become necessary to process whole heavy petroleum crudes and residua from unconventional sources, and synthetic fuels (syncrudes; e.g. liquified coal, oil from coal carbonization, oil from tar sands, shale oil and the like inclusive of residua or viscous syncrude fractions) are under active consideration as commercial feedstock replacements for petroleum. Many of the hydrocarbons from these sources contain very fine particulate solids (e.g., sand, clays, oil shale, coal ash, carbonaceous particles and the like) in concentrations which must be removed before such materials can be employed as feedstocks in conventional refining operations.

The presence of the finely divided solids, particulates, or dusts, in such liquids presents a major problem in processing hydrocarbons from these sources. For example, in shale oil, recovered from oil shale in situ or ex situ, extremely finely divided shale solids are concentrated in the shale oil, particularly in the heavy shale oil fractions. Thus, the oil produced by retorting oil shale is frequently contaminated with shale fines, the amount and characteristics of which may vary widely, and are a function of both the source of oil shale and the retorting process used. For example, oil produced from Colorado shale by a surface retorting process typically contains from about 2 to about 6 weight percent of approximately 5 micron mean diameter relatively non-porous particles. In contrast, oil produced from a surface retorted Australian shale typically contains from about 8 to about 16 weight percent of approximately 4 micron mean diameter particles, many of which are porous and some non-porous. Shale oils as a class present very difficult solids separation problems. Many shale oils contain non-porous solids carbonates, and others contain porous clay based materials, or both. The clay based solids may present added separation problems as contrasted with those containing predominately carbonate solids, and such shale oils often generally contain very high solids concentrations. The concentration of solids in such fractions often ranges as high as about 8 percent or 10 percent, often even as high as 16 percent, and higher. These solids, major portions of which typically range in size from about 0.5 micron to about 5 microns, often from about 1 micron to about 4 microns, are extremely difficult to remove from the shale oil. Moreover, the shale oil contains high concentrations of olefinic compounds, these reacting with one another or other compounds to form gums, or high molecular weight polymers, this adding to the difficulty of separating water and solids from the shale oil. Such materials intefere with refinery operations by clogging catalysts, coating process equipment, heat exchange surfaces, and the like. Conventional filtration and centrifugation process per se are simply inadequate for dedusting, or removing the gums and particulate solids from shale oil, or other types of low grade heavy petroleum feedstocks and syncrudes, especially heavy oil fractions and residua. Equipment and processing costs are horrendous, and loss of oil is one of the largest process debits. Waste disposal problems created by the necessity of disposing of oil wet solids adds to the burden.

It is conventional to "desalt" petroleum crudes to remove water and salts. In a typical desalting process, a surface active agent and water are often added to the petroleum crude, passed through a mixer to form an emulsion, and the emulsion then heated and passed to a desalting vessel, or staged series of such vessels. In a desalting vessel, technically termed an electrostatic coalescer, the emulsion is subjected to a high voltage electrostatic field to cause droplets of water to coalesce and form separate phases; a water phase and a clean oil phase separated by an emulsion phase. A low salt, essentially water-free oil phase forms as an upper stratum, and a salt-containing aqueous phase forms as a bottom stratum, with an emulsion phase located between the clean oil and water strata. The low salt, essentially water free (low BS&W) oil phase is withdrawn from the top of the vessel for refinery processing, and the salt-containing aqueous phase is withdrawn from the bottom of the vessel and discharged as an effluent.

Solids have been removed from shale oil by the addition of water to the shale oil, and the mixture then subjected to an electrostatic field to resolve the mixture into a dedusted shale oil phase, and an aqueous phase which carries the finely divided solids. Reference is made, e.g., to U.S. Pat. No. 3,951,771 which issued on Apr. 20, 1976 to E. D. Burger. In accordance with the Burger process an electrostatic coaleser and centrifuge are employed in combination to remove solids from shale oil which contains low to moderate concentrations of solids. The solids content of the shale oil is reduced in the electrostatic coalescer, but the oil losses present a serious problem. Reference is also made to U.S. Pat. No. 3,929,625 which issued Dec. 30, 1975 to Roy M. Lucas. In accordance with the process described by this reference, a surface active agent and water are admixed with the oil to form an emulsion, and the emulsion is then transferred to an electrostatic coalescer to form a separate clean oil phase and a solids-containing aqueous phase, the former of which is recovered as a feedstock for use in refinery operations. A poly oxyalkylene derived nonionic polymeric surfactant is employed as the surface active agent, exemplary of which are oxypropylated, oxyethylated, polyethylene amine and oxypropylated, oxyethylated butyl phenol formaldehyde resin. Solids removed from shale oil by water washing/electrostatic coalescence, however, has not been particularly effective, and such treatment is particularly ineffective when employed to dedust oils which contain about 6 weight percent solids, or higher. Above this level of solids concentration phase separation within the electrostatic coalescer is not only difficult, but an unacceptably high level of oil is contained in the water effluent. Moreover, the solids content of the water effluent is sufficiently high that flow is difficult due to the extremely high viscosity. Whereas diluents, e.g., naphtha, diesel oil and the like, may be added to the crude oils prior to treatment to reduce the total solids concentration, this necessitates an added step for recovery of the diluent which is a burden on the process.

It is, accordingly, the primary object of the present invention to obviate these and other prior art deficiencies, particularly by providing novel compositions, and process for dedusting unconventional whole heavy petroleum crudes, heavy petroleum crude fractions and residua, syncrudes, syncrude fractions, and syncrude residua.

A particular object is to provide novel compositions, and process for dedusting unconventional whole heavy petroleum crudes, heavy petroleum crude fractions and residua, syncrudes and syncrude fraction which contains above about 6 weight percent finely divided solids, to provide a clean oil product, or product suitable for use in refining operations.

A further, and more particular object is to provide novel compositions useful as additives in the dedusting of shale oil, and process wherein the additive containing shale oil, particularly shale oil which contains above about 6 weight percent finely divided solids, to provide a shale oil effluent suitable for use in refining operations; the use of such additives, or process utilizing such additives, being particularly useful for dedusting a shale oil where it is desired to hydrogenate (or hydrogen treat) a feedstock constituting a major portion or substantially the whole shale oil, or high solids-containing bottoms fraction of the shale oil.

These objects and others are achieved in accordance with the present invention:

(I) A composition useful as a surfactant, which comprises (A) an ethoxylated or propoxylated ester characterized as follows:

where $R_1$, $R_2$, $R_3$, and $R_4$ are selected from (a) ethoxy or propoxy groups, or mixed ethoxy and propoxy groups, and (b) the de-hydroxylated residue of a fatty acid molecule, or moiety represented by the formula where R is a straight-chain hydrocarbon moiety which can be substituted or unsubstituted, saturated or unsaturated, and where unsaturated can contain conjugated or unconjugated double bonds. The hydrocarbon moiety can thus be exemplified by hydrocarbon groups which range from about 6 to about 30 carbon atoms, preferably from about 8 to about 20 carbon atoms, e.g., alkyl groups such as n-hexyl, n-octyl, n-decyl, n-dodecyl, n-octadecyl, octenyl, 9-octadecenyl, etc. This moiety can be further represented as the de-hydroxylated residue of fatty acids such as caprylic, capric, lauric, myristic, eleostearic, licanic, arachidic, arochidonic, behenic, lignoceric, nisinic and the like.

In the formula, at least one and up to three of $R_1$, $R_2$, $R_3$, and $R_4$ is ethoxy, propoxy or mixed ethoxy and propoxy groups, and conversely at least one and up to three of $R_1$, $R_2$, $R_3$, and $R_4$ is the residue of a fatty acid molecule, or moiety represented by the formula RCO—. Ethoxy, propoxy, or mixed ethoxy and propoxy groups, are thus attached through oxygen to from one to three of the 2, 3, 5 or 6 carbon atoms of the 1, 4-sorbitan skeleton, and from one to three of the fatty acid chains are attached through oxygen to the 2, 3, 5 or 6 carbon atoms of the 1, 4-sorbitan skeleton. In other words, all of the $R_1$, $R_2$, $R_3$ and $R_4$ substitutents attached through oxygen to the 2, 3, 5 or 6 carbon atoms are either ethoxy, propoxy or mixed ethoxy/propoxy groups or RCO— groups, and up to three of the substitutents can be ethoxy, propoxy or mixed ethoxy/propoxy groups with the remainder RCO—, or up to three of the substitutents can be RCO— with the remainder ethoxy, propoxy or mixed ethoxy/propoxy groups. The fatty acid moiety is generally not a pure species but comprised of mixtures of acid moieties. The molecular species is thus not a pure compound, but an admixture of compounds. Within the admixture of compounds, the molecular average of the admixture, or average molecule, preferably contains about three of the ethoxy, propoxy or mixed ethoxy/propoxy chains, and about one fatty acid chain. In an individual $R_1$, $R_2$, $R_3$ or $R_4$ group, where from one to three of $R_1$, $R_2$, $R_3$ and $R_4$ are ethoxy, propoxy or mixed ethoxy and propoxy groups, the number of ethoxy, propoxy or mixed ethoxy/propoxy groups can range from 1 to about 50, preferably from about 1 to about 25, and more preferably from about 2 to about 10, and the sum total of the ethoxy, propoxy or mixed ethoxy/propoxy groups in the molecule ranges from about 5 to about 50, preferably from about 10 to about 30. The end of the molecule which contains the 1, 4-sorbitan skeleton tends to be water soluble, and the end of the molecule which contains the fatty acid chain tends to be water insoluble. In use, the solids particles in an oil are water wet, and encapsulated by the action of the surfactant, the water droplets being coalesced into larger droplets which settle out with the solids particles.

The surfactant is preferably constituted of an admixture of said ethoxylated or propoxylated ester and a second component, and most preferably said second component and a third component. The second component of the surfactant is characterized as (B) an organo, hydrocarbyl, or aromatic monosulfonic acid, or admixture of such acids, having the formula wherein $R_5$ is organo, or hydrocarbyl radical, or hydrocarbon radical selected from the group consisting of alkyl, aralkyl, cycloalkyl, aryl, alkaryl, alkenyl, and alkynyl including such radicals when inertly substituted. The hydrocarbon moiety is exemplified by hydrocarbon groups which range from about one to about 30 carbon atoms, preferably from about one to about 20 carbon atoms. When $R_5$ is alkyl, it can typically be methyl, ethyl, n-propyl, iso-propyl, n-butyl, i-butyl, sec-butyl, amyl, octyl, decyl, octadecyl, or the like. When $R_5$ is aralkyl it can typically be benzyl, beta-phenylethyl, and the like. When $R_5$ is cycloalkyl, it can typically be cyclopentyl, cyclohexyl, cycloheptyl, cyclooctyl, 2-methyl-cycloheptyl, 3-butyl cyclohexyl, 3-methyl cyclohexyl, and the like. When $R_5$ is aryl, it can typically be phenyl, naphethyl, and the like. When $R_5$ is alkaryl, it can typically be tolyl, xylyl, and the like.

When $R_5$ is alkenyl, it can typically be vinyl, allyl, 1-butenyl, and the like. When R is alkynyl, it can typically be ethynyl, propynyl, butynyl, and the like. $R_5$ can be inertly substituted, i.e., bear a non-reactive substitutent such as alkyl, aryl, cycloalkyl, ether, halogen, nitro, etc. The benzene ring can also be further inertly substituted. Typically inertly substituted $R_5$ groups and ring substitutents may include 3-chloropropyl, 2-ethoxyethyl, carboethoxy-methnyl, 4-methyl cyclohexyl, p-chlorophenyl, p-chloro benzyl, 3-chloro-5-methylphenyl, etc. The preferred $R_5$ groups are alkyl, polyalkyl, aryl, polyaryl, alkoxy, polyalkoxy, arylalkyl, or alkylaryl hydrocarbon radicals having from about 4 to about 18 carbon atoms, preferably from about 12 to about 15 carbon atoms. Preferably the substitutent hydrocarbon group is saturated or unsaturated, straight-chain or branched-chain, e.g., n-butyl, isobutyl, n-pentyl, isopentyl, n-hexyl, n-heptyl, n-octyl, isooctyl, 2-ethylhexyl, isobutyl, n-nonyl, tripropylene, n-decyl, undecyl, n-dodecyl, tridecyl, n-tetradecyl, pentadecyl, n-hexadecyl, n-octadecyl, eicosyl, docosyl, vinyl, propenyl, octenyl, 10-undecenyl, 9 octadecenyl, cyclopentyl, cyclohexyl, cyclohexamethyl, and the like; and $R_5$ is in an ortho or para position on the benzene nucleus relative to the sulfonic acid group.

Compounds of this class include, for example, aromatic monosulfonic acids wherein the benzene ring is substituted with up to five organic, or hydrocarboyl radicals, i.e., alkyl, polyalkyl, alkoxy, alkyl thio, and polyalkoxy ether radicals and the like.

Specific examples of sulfonic acids of this type include the alkyl or polyalkyl substituted benzene sulfonic acid, an alkyl substituted phenol sulfonic acid such as dodecyl benzene sulfonic acid, keryl benzene sulfonic acid, nonylbenzene sulfonic acid, dinonyl benzene sulfonic acid, trihexyl benzene sulfonic acid, nonyl phenol sulfonic acid, tetradecyl benzene sulfonic acid, and the like.

The admixture, as suggested, most preferably also includes a third component, or mixture of such components, viz., (C) an ammonium ion, substituted ammonium ion or alkali metal substituted organo, hydrocarbyl, or aromatic monosulfonic acid, i.e., an ammonium ion, substituted ammonium ion or alkali metal sulfonate characterized by the formula wherein M is an ammonium ion, substituted ammonium ion or metal selected from Group I-A of the Periodic Table of the Elements (E. H. Sargent & Co. Scientific Laboratory Equipment, Copyright 1962), preferably sodium, and

$R_6$ is organo, a hydrocarbyl radical, or hydrocarbon radical selected from the group consisting of alkyl, aralkyl, cycloalkyl, aryl, alkaryl, alkenyl, and alkynyl including such radicals when inertly substituted. The hydrocarbon moiety is exemplified by hydrocarbon groups which range from about one to about 30 carbon atoms, preferably from about one to about 20 carbon atoms. When $R_6$ is alkyl, and can typically be methyl, ethyl, n-propyl, iso-propyl, n-butyl, i-butyl, sec-butyl, amyl, octyl, decyl, octadecyl, and the like. When $R_6$ is aralkyl it can typically be benzyl, betaphenylethyl, and the like. When $R_6$ is cycloalkyl, it can typically be cyclopentyl, cyclohexyl, cycloheptyl, cyclooctyl, 2-methyl-cycloheptyl, 3-butyl cyclohexyl, 3-methyl cyclohexyl, and the like. When $R_6$ is aryl, it can typically be phenyl, naphethyl, and the like. When $R_6$ is alkaryl, it can typically be tolyl, xylyl, or the like. When $R_6$ is alkenyl, it can typically be vinyl, allyl, 1-butenyl, and the like. When $R_6$ is alkynyl, it can typically be ethynyl, propynyl, butynyl, and the like. $R_6$ can be inertly substituted, i.e., bear a non-reactive substitutent such as alkyl, aryl, cycloalkyl, ether, halogen, nitro, etc. The benzene ring can also be further inertly substituted. Typically inertly substituted $R_6$ groups may include 3-chloropropyl, 2-ethoxyethyl, carboethoxymethnyl, 4-methyl cyclohexyl, p-chlorophenyl, p-chloro benzyl, 3-chloro-5-methylphenyl, etc. The preferred $R_6$ groups are alkyl, polyalkyl, aryl, polyaryl, alkoxy, polyalkoxy, arylalkyl or alkylaryl hydrocarbon radicals having from about 4 to about 18 carbon atoms, preferably from about 12 to about 15 carbon atoms. Preferably the substitutent hydrocarbon group is saturated or unsaturated, straight-chains or branched-chains, e.g., n-butyl, isobutyl, n-pentyl, isopentyl, n-hexyl, n-heptyl, n-octyl, isooctyl, 2-ethylhexyl, isobutyl, n-nonyl, tripropylene, n-decyl, undecyl, n-dodecyl, tridecyl, n-tetradecyl, pentadecyl, n-hexadecyl, n-octadecyl, eicosyl, docosyl, vinyl, propenyl, octenyl, 10-undecenyl, 9 octadecenyl, cyclopentyl, cyclohexyl, cyclohexamethyl, and the like; and the $R_6$ in an ortho or para position on the benzene nucleus relative to the ammonium ion, substituted ammonium ion, or metal sulfonate group.

Exemplary of suitable ammonium or alkali metal sulfonates are the ammonium, sodium, or potassium salts of aromatic monosulfonic acids wherein the benzene ring is substituted with up to five organic, or hydrocarboyl radicals, e.g., alkyl, polyalkyl, alkoxy, alkyl thio, polyalkoxy ether radicals and the like.

Specific examples of sulfonic acid salts of this type include the ammonium or substituted ammonium salt of the alkyl or polyalkyl benzene sulfonic acid, i.e., ammonium dodecylbenzene sulfonate, triethanolamine dodecylbenzenesulfonate, sodium salt of the alkyl or polyalkyl benzene sulfonic acid, such as the sodium salt of dodecyl benzene sulfonic acid, the sodium salt of keryl benzene sulfonic acid, the sodium salt of dinonyl benzene sulfonic acid, the sodium or potassium salt of trihexyl benzene sulfonic acid, the sodium or potassium salt of nonyl phenol sulfonic acid, the sodium or potassium salt of tetradecyl benzene sulfonic acid, and the like.

In its most preferred aspects the composition of this invention includes not only the surfactant characterized in I(A), preferably I(A)+I(B), or more preferably I(A)+I(B)+I(C), but also the additional presence of an oil soluble demulsifier.

(II) The demulsifier is constituted of an ethoxylated or propoxylated, or admixed ethoxylated/propoxylated, phenol formaldehyde resin substituted at a position para to the ethoxy or propoxy group, or mixed ethoxy/propoxy groups, by an organo, hydrocarbyl or hydrocarbon group, said modified phenol formaldehyde resin being characterized as follows:

wherein

R₇ represents one or more ethoxy or propoxy groups, or mixed ethoxy and propoxy groups, and R₈ is a hydrocarbyl radical, or hydrocarbon radical selected from the group consisting of alkyl, aralkyl, cycloalkyl, aryl, alkaryl, alkenyl, and alkynyl including such radicals when inertly substituted. The hydrocarbon moiety is exemplified by hydrocarbon groups which range from about one to about 30 carbon atoms, preferably from about one to about 20 carbon atoms. When R₈ is alkyl, R₈ can typically be methyl, ethyl, n-propyl, iso-propyl, n-butyl, i-butyl, sec-butyl, amyl, octyl, decyl, octadecyl, and the like. When R₈ is aralkyl it can typically be benzyl, betaphenylethyl, and the like. When R₈ is cycloalkyl, it can typically be cyclopentyl, cyclohexyl, cycloheptyl, cyclooctyl, 2-methyl-cycloheptyl, 3-butyl cyclohexyl, 3-methyl cyclohexyl, and the like. When R₈ is aryl, it can typically be phenyl, ethylphenyl, and the like. When R₈ is alkaryl, it can typically be tolyl, xylyl, and the like. When R₈ is alkenyl, it can typically be vinyl, allyl, 1-butenyl, and the like. When R₈ is alkynyl, it can typically be ethynyl, propynyl, butynyl, and the like. R₈ can be inertly substituted, i.e., it may bear a non-reactive substitutent such as alkyl, aryl, cycloalkyl, ether, halogen, nitro, and the like. Typically inertly substituted R₈ groups may include 3-chloropropyl, 2-ethoxyethyl, carboethoxymethnyl, 4-methyl cyclohexyl, p-chlorophenyl, p-chloro benzyl, 3-chloro-5-methylphenyl, etc. In the formula, m is an integer of 1 or greater than 1, and the molecular weight of the demulsifier, or resin, generally ranges from about 2000 to about 20,000, preferably from about 5000 to about 10,000. The resin can be unmodified, or modified as by substitution or addition of substitutents in the side chains or nucleus of the aromatic constitutents of the molecules, especially by reaction at one or both terminal nuclei.

The compounds per se characterized as I(B), I(C) and II are known. The fatty acid esters characterized as I(A) are prepared by direct esterification of 1,4-sorbitan. In the preparation of the fatty acid esters a preselected amount of the fatty acid is charged into a reaction vessel and admixed with incremental charges of the ethylene or propylene oxide, or both, at controlled temperature and pressure until substantially equivalent molar amounts of the two reactants have been reacted, and reaction is complete. For example, 4000 pounds of sorbitan monooleate is charged into a stainless steel vessel and admixed initially with 30 pounds of ethylene oxide, the reaction mixture being vented, purged of air and stirred while controlling the temperature below about 275° F. and pressure of about 0–15 psig. While controlling the temperature and pressure at these conditions, increments of the ethylene oxide are continuously added until the reaction is complete. Thus, a charge of ethylene oxide in the amounts of 5000 pounds and 4460 pounds, respectively, are placed in weigh tanks and, while controlling the temperature of between about 270°–275° F., the ethylene oxide is charged to the stirred reaction vessel at a rate of about 2 gallons per minute. As the temperature and pressure subside, the rate of addition of ethylene oxide is increased to about 4 gallons per minute. When reaction has been completed, and all of the ethylene oxide has been added, the reaction vessel is purged with nitrogen, and thereafter the reaction mixture is neutralized with sodium hydroxide, and the fatty acid ester separated from the reaction mixture.

The surfactant and demulsifier are prepared prior to use by dissolving one or both ingredients in an oil soluble solvent, and preferably each is separately dissolved in an oil soluble solvent and the solvent-containing additives blended together at the time they are added to the oil. Exemplary of oil soluble solvents for dissolving these additives are aromatic hydrocarbons having a single benzene nucleus, preferably aromatic hydrocarbons containing from 6 to about 9 carbon atoms, e.g., xylene, n-propyl benzene, isopropyl benzene and the like; cycloparaffin hydrocarbons which contain from 4 to about 9 carbon atoms, e.g., cyclobutane, cyclopentane, cyclohexane, cycloheptane and the like; water soluble alcohols such as propyl alcohol, isopropyl alcohol, isobutyl alcohol, sec-butyl alcohol, t-butyl alcohol and the like; aromatic alcohols such as triphenylcarbinol and the like; water soluble polyhydric alcohols such as ethylene glycol, hexamethylene glycol, glycerol and the like; or admixtures of these and/or other solvents.

The invention resides in the discovery of novel surfactants, and particularly novel admixtures of surfactants and demulsifiers for removing very finely divided particulate solids from solids-containing petroleum and syncrudes. Generally, the surfactant and demulsifier prior to use are each dissolved in a suitable solvent and each separately added, or blended together and then added, to the solids-containing whole heavy crude petroleum or syncrude, or petroleum or syncrude fraction at the site wherein the solids are to be removed from the oil. The surfactant and demulsifier are added, with water, to the solid-containing oil in concentrations adequate to remove the solids from the oil, and concentrate the solids within the water phase. Suitably, the surfactant, or surfactants, and the demulsifier, or demulsifiers, are added to the oil in concentration ranging from about 10 parts to about 5000 parts, preferably from about 30 parts to about 80 parts, per million parts by volume of oil (vppm). The ratio of the two immiscible liquids, which creates a large interfacial area between the oil and water phases. The principles for the formation of oil and water emulsions are well known. The addition of a surfactant into an oil significantly lowers the interfacial tension of the oil against water due to the concentration of the surfactant at the oil/water interface and promotes emulsification between the oil and water faces. On the other hand, a demulsifier, at least to an extent, breaks the oil/water emulsion by removing the oil film from around the solids particles, and cleans the water phase of oil. In the instant situation, the surfactant of this invention cleans the surfaces of the solids of oil and aids in the transfer of solids to the water phase. The demulsifier causes the small water droplets to coalesce, and at the same time cleans, or purges, the oil from the water phase. The surfactant is, in fact, outstanding in its effectiveness in wetting the solids, and cleaning the surfaces of the solids of oil, and the demulsifier is similarly effective in breaking the oil and water emulsion, and in removing and transferring oil from the water phase to the oil phase. The wetted solids are readily transferred from the oil phase to the water phase.

Water is added to the oil containing the surfactant and demulsifier, generally in concentration ranging from about 5 percent to about 50 percent, preferably from about 10 percent to about 30 percent, based on the volume of the oil. The oil and water are then emulsified, as by shearing the oil and water in a mixer. The contacting water, in the presence of the surfactant water wets and cleans the solids particles and transfers the solids to the water phase. The action of the demulsifier causes the small drops of water to coalesce and cleans the oil from the water phase. Upon gravity settling, preferably at elevated temperature which is helpful in breaking the emulsion, the solids-containing water phase cleanly separates from the oil phase. In a preferred embodiment, however, the oil and water emulsion is transported, or flowed, into an electrostatic coaleser to form a clean oil phase overflow and solids-containing water phase underflow; or where the whole heavy crude petroleum or syncrude oil, or petroleum or syncrude fraction contains a particularly high concentration of solids, the oil and water emulsion can be treated initially by gravity settling to effect partial separation of a solids-containing water phase, and the remaining emulsion and/or oil phases further treated in an electrostatic coalescer, or staged series of electrostatic coalescers.

In accordance with the best mode of practicing the process, two schemes of operation are generally employed depending upon the nature and concentration of solids contained in the oil. A first process scheme embodies treatment of an oil which contains a low to moderate amount of solids, e.g. about 2 to 6 percent solids, and a second embodies treatment of an oil which contains moderate to high concentrations of solids, e.g. about 6 to 16 percent solids.

Figure 1:
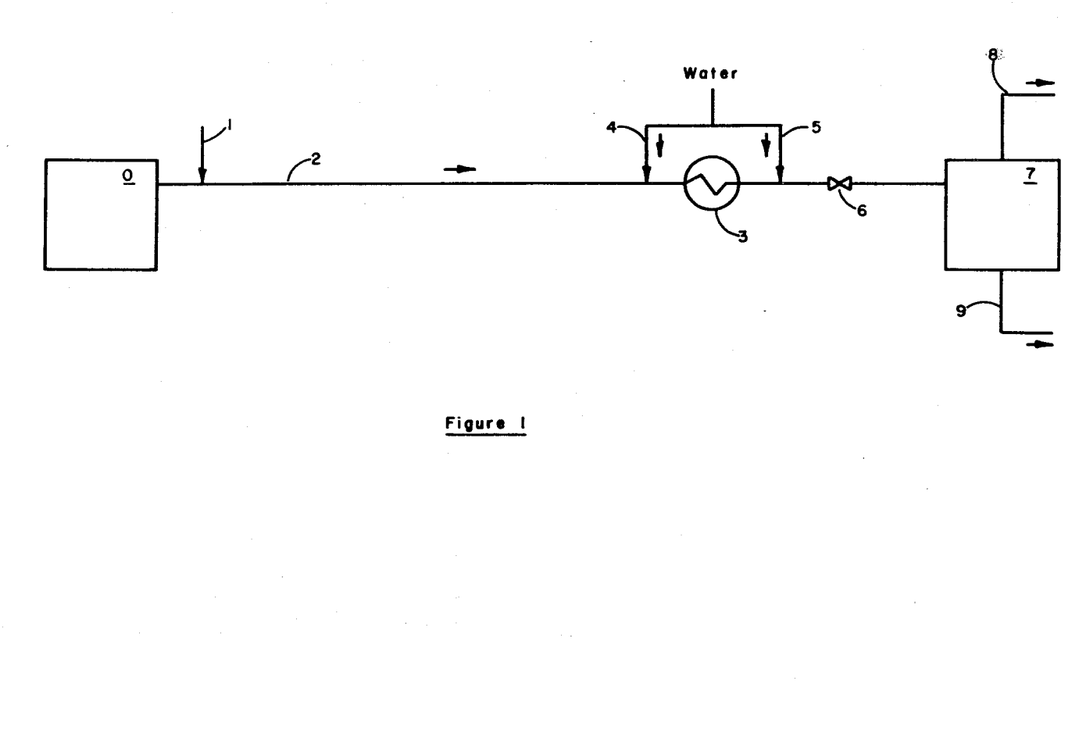
FIG. 1 schematically depicts a continuous process for treating an oil, typically a shale oil, which contains a low to moderate amount of shale solids.

With reference to FIG. 1, shale oil is received from a source, e.g., a storage tank 0. The oil contains a low to moderate level of solids, much of which is perhaps non-porous solids. An admixture of surfactant and demulsifier is added directly to the oil downstream of the point where it is withdrawn from storage tank 0, i.e., via line 1. In treating an oil which contains low to moderate amounts of solids, generally from about 20 parts to about 300 parts, preferably from about 20 parts to about 100 parts, per million parts by volume (vppm) of oil, of the surfactant and demulsifier are added. A washwater is then added to the oil upstream of heat exchanger 3 as via line 4. The whole of the required amount of washwater can be added at this point, or part of the washwater can be added at this point and additional water added downstream of the heat exchanger 3 as via line 5.

In the practice of the process, generally the whole of the required amount of surfactant and demulsifier are added upstream of heat exchanger 3. Generally, from about 5 percent to about 90 percent, preferably from about 30 percent to about 60 percent, of the required washwater is added as primary washwater upstream of the heat exchanger 3 and the balance of the washwater, or secondary washwater, is added downstream of the heat exchanger 3. The heat transmitted through the heat exchanger 3 is sufficient to raise the temperature of the primary water, additives and oil passed therethrough to from about 100° F. to about 350° F., preferably from about 200° F. to about 280° F. Addition of primary washwater is essential to suppress the formation of deposits, scale and other forms of encrustation, on heat exchanger surfaces. The water, additives and oil must be thoroughly admixed to form an emulsion, and hence can be next passed through a mixer, e.g., a mix valve 6 and sheared to form an emulsion. A differential pressure of from about 3 pounds per square inch (psi) to about 30 psi, preferably from about 5 psi to about 15 psi is maintained across the mix valve 6. A globe valve is generally a suitable type of mixer for this purpose; though various other types of mixing devices can be employed, e.g., in-line dynamic mixers, centrifugal pumps and the like. The emulsion is then passed into an electrostatic coalescer 7, or series of staged electrostatic coalescers (not shown). [Elelcto-static coalescers of suitable type are described, e.g., in "Chemical Engineering Progress" vol. 61, no. 10, October 1965 at Pages 51–57 in an article by Logan C. Waterman. Commercial units are available from Petrolite Corporation and Howe Baker.] The temperature of the oil and water emulsion within the electrostatic coalescer 7 ranges from about 100° F. to about 350° F., preferably from about 200° F. to about 280° F., and the residence time of the emulsion, oil and water phases within the electrostatic coalescer 7 ranges from about 10 minutes to about 80 minutes, preferably from about 20 minutes to about 60 minutes. Within the electrostatic coalescer 7 the emulsion is separated into a clean oil phase which is removed as an overflow from the vessel via line 8, and a solids-containing water phase which is removed as an underflow from the vessel via line 9.

Figure 2:
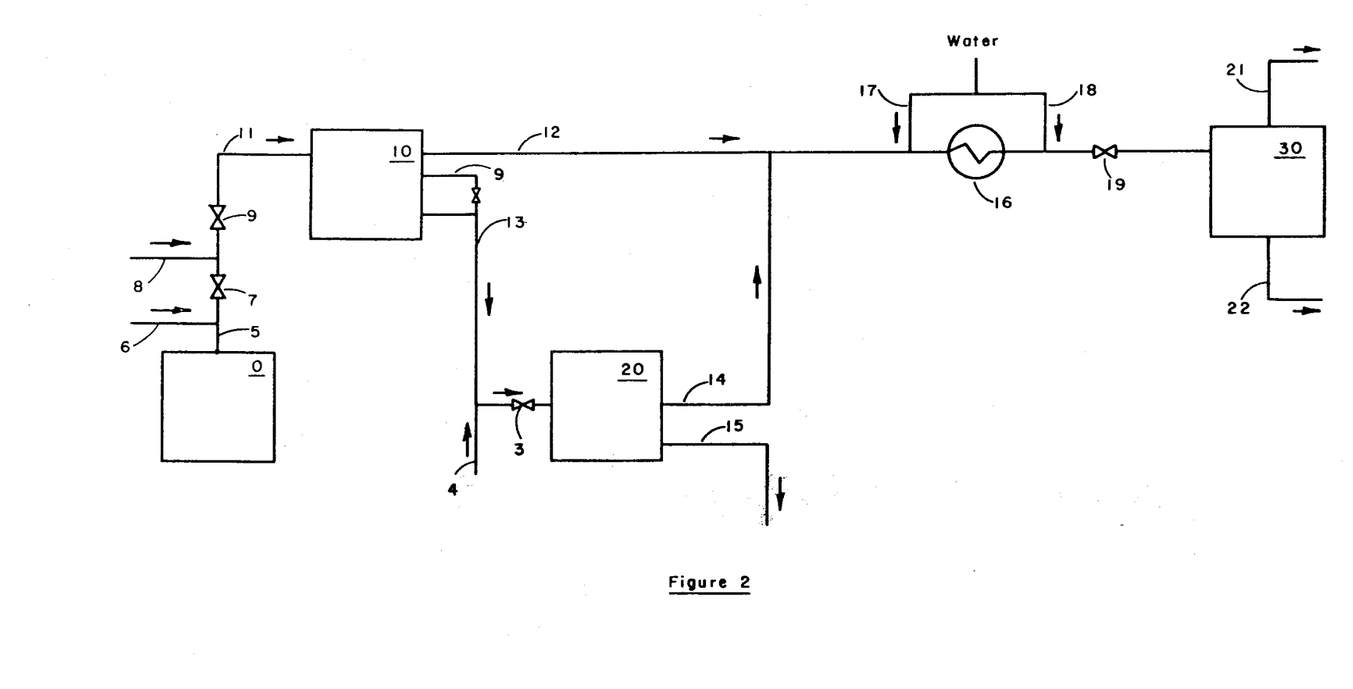
FIG. 2 schematically depicts a continuous process for treating an oil, typically a shale oil, which contains moderate to high amounts of solids.

Reference is now made to FIG. 2, this figure showing a preferred type of facility for treating a moderate to high solids-containing shale oil, suitably one which may contain both porous and non-porous solids. This facility provides for an initial treatment of the oil in one or a plurality of stages, preferably the latter, notably within settling tanks (or vessels which are the equivalent of settling tanks) to remove a major portion of the solids, and thereafter the remainder of the solids are removed from the oil generally as described by reference to the preceeding figure.

In accordance with this process, oil is withdrawn via line 5 from a suitable source, suitably a storage tank 0, and the surfactant and demulsifier are added to the oil as via line 6 and admixed with the oil by passage through a suitable mixer 7. Water is added to line 5 downstream of mixer 7 via line 8. The sum total of the additive, water and oil are then passed through mixer 9, emulsified, and then introduced into vessel 10 via line 11. The surfactant and demulsifier generally are added in concentrations ranging from about 100 vppm to about 3000 vppm, preferably from about 500 vppm to about 2000 vppm, and the temperature of the contents of the tank is maintained at from about ambient to about 200° F., preferably from about 150° F. to about 180° F. An oil phase overflow is withdrawn via line 12 from the top of the vessel 10 after settling, and it is passed via line 12 through heat exchanger 16. A water phase underflow, which contains a preponderance of solids, is withdrawn from vessel 10 and optionally passed via line 13 to the second vessel 20, and if desired additional fresh water and additive can be admixed with the water, as via line 4, 3, and the admixture of additive and water then fed through mixer 3 into vessel 20. Optionally, some of the emulsion can be withdrawn via valved line 9 and also passed via line 13 to vessel 20. An oil effluent is removed from vessel 20 via line 14, and combined with the oil effluent in line 12 from vessel 10. A solids-containing water stream is removed from vessel 20 via line 15. The oil effluent from lines 12, 14 is then treated as described in the process described by reference to FIG. 1.

The oil, partially denuded of solids by treatment in vessels 10, 20, is then admixed with additional water introduced on the upstream side of heat exchanger 16 via line 17, with secondary water being added via line 18 on the downstream side of the heat exchanger, if desired. As previously suggested, the oil, water and additive is passed through heat exchanger 16 and heated sufficiently to raise the temperature of the oil, water and additive from about 100° F. to about 350° F., preferably from about 200° F. to about 280° F. The admixture is then sheared or emulsified in mixer 19. Suitably, the admixer 19 is a mix valve and the admixture is sheared at differential pressures ranging from about 3 psi to about 30 psi, preferably from about 5 psi to about 15 psi, to form an emulsion. The emulsion is then fed into an electrostatic coalescer 30, or series of electrostatic coalescers, the emulsion, oil and water phases being maintained in said electrostatic coalescer 30 for a time sufficient to provide a residence time ranging from about 10 minutes to about 80 minutes, preferably from about 20 minutes to about 60 minutes, and at a temperature ranging from about 100° F. to about 350° F., preferably from about 200° F. to about 280° F. A clean oil overflow is removed from the top of the electrostatic coalescer 30 via line 21 while a solids-containing aqueous stream underflow is removed from electrostatic coalescer 30 via line 22.

The following examples, and comparative demonstrations, are further exemplary, particularly of the high effectiveness of the novel additives of this invention, and process, in removing solids from whole heavy crude petroleum and syncrudes, and fractions and residua thereof. In the examples and demonstrations, all parts are in terms of weight units except as otherwise specified, residence times in terms of minutes, and temperatures in terms of degrees Farhenheit.

Examples 1–6 describe a continuous process for treating a whole shale oil which contains a low to moderate amount of solids, such as would be obtained from a commercial surface retorting plant operation. Shale oil fractions, and a shale oil diluent obtained from a pilot plant operation were blended together to simulate a commercial whole shale oil feed.

EXAMPLES 1–6

In conducting a series of treatments to demonstrate the effectiveness of the process in removing solids particles from a commercially produced raw Colorado shale oil via the procedure generally described by reference to FIG. 1, a solids-containing Parachute Creek, Green River Basin surface retorted raw shale oil (obtained from Mahogany Zone precursor shale) was employed. A shale oil was obtained from a pilot plant which recovered a liquid product from the surface retorted shale in three separate fractions, a bottom oil, a distillate, and a naphtha; the three fractions being combined to provide a "whole oil". The inspections (solids free basis) on the raw whole oil are given in Table I-A. Since, however, the pilot plant did not achieve complete condensation of light oil components, the pilot plant whole oil was heavier than that estimated for a more efficient commercial plant. Therefore, by combining the assays of liquid and vapor streams from the pilot plant, a total liquid product characteristic of that which would be expected from a commercial plant was obtained as shown in Table I-B. A commercial liquid product would thus be expected to have a density of 27 °API as contrasted with the heavier 20.6 °API of the pilot plant "whole oil". Raw liquid shale oil for studying the effect of oil density to simulate commercial operations was thus prepared by adding additional amounts of the distillate or naphtha fractions to the "whole oil," inspections for the distillate and naphtha being given in Tables I-C and I-D, respectively.

TABLE I-A

| Pilot Plant "Whole Oil" | |
|---|---|
| Gravity, °API | 20.6 |
| VIS @ 100° F., cs | 22.0 |
| 15/5 Distillation | |
| IBP | — |
| 5% | 230° F. |
| 10 | 310 |
| 20 | 440 |
| 30 | 560 |
| 40 | 650 |
| 50 | 740 |
| 60 | 830 |
| 70 | 940 |
| 80 | 1030 |

TABLE I-B

Anticipated Total Liquid Product From Commercial Retorting Plant, Colorado Shale (computer generated from assays of liquid and vapor streams from pilot plant)

| $C_5^+$ Fractions Boiling Point Range, °F. | Gravity °API | Volume % |
|---|---|---|
| 75–100 | 83.0 | 3.6 |
| 100–200 | 66.7 | 4.5 |
| 200–300 | 55.1 | 6.8 |
| 300–400 | 44.8 | 7.2 |
| 400–500 | 36.9 | 6.4 |
| 500–600 | 29.1 | 8.2 |
| 600–700 | 23.2 | 9.1 |
| 700–800 | 19.5 | 11.5 |
| 800–900 | 16.7 | 11.5 |
| 900–1000 | 13.8 | 11.2 |
| 1000–1100 | 10.4 | 7.7 |
| 1100–1200 | 6.3 | 6.3 |
| 1200+ | 2.6 | 6.0 |
| Total | 27.0 | 100.0 |

TABLE I-C

| Pilot Plant Distillate | | | |
|---|---|---|---|
| Gravity 27.9 °API | | | |
| D86 Distillation | | Vac Distillation | |
| IBP | 181° F. | 5% | 144° C. |
| 5% | 219 | 10 | 174 |
| 10 | 323 | 20 | 212 |
| 20 | 367 | 30 | 237 |
| 30 | 395 | 40 | 264 |
| 40 | 433 | 50 | 296 |
| 50 | 468 | 60 | 338 |
| 60 | 507 | 70 | 435 |
| 70 | 566 | 80 | 595 |
| 80 | 641 | 87 | 714 |
| | cracked | | cracked |

TABLE I-D

| Pilot Plant Naphtha | | |
|---|---|---|
| Gravity 47.1 °API | | |
| 84.8% C | vis @ 40° C. | 1.3 cs |
| 12.9% H | | |
| 0.88% S | | |
| 0.72% O | | |
| 0.7% N | | |
| D86 Distillation | | |
| IBP | | 119° F. |
| 5% | | 160 |
| 10 | | 176 |
| 20 | | 203 |
| 30 | | 230 |
| 40 | | 260 |
| 50 | | 292 |
| 60 | | 328 |
| 70 | | 388 |
| 80 | | 449 |
| 90 | | 550 |
| FBP | | 614 |

The whole oil was added to, and then withdrawn as needed from a storage tank, blended with diluent, and used in a series of tests as described by reference to Table I-E. The portions of raw shale oil were blended with water and an admixture of a surfactant and demulsifier and fed through a heat exchanger to heat the admixture to the operating temperature of the electrostatic coalescer, or electrostatic coalescers, as described by reference to FIG. 1. The specific surfactant and demulsifier used in the series of tests described by reference to Table I-E, inclusive of non-active ingredients, are identified as follows:

Surfactant

Ethylene glycol mono-butyl ether 5.03%, 20 mole E.O. (ethylene oxide) on sorbitan mono-oleate 35.35%; water 0.51%; sodium sulfate 0.12%; dodecyl benzene sulfonic acid 4.88%; $H_2SO_4$ in inert oil 0.07%; water 0.03%; total water in product=0.54%; sodium sulphonate (in mineral oil) 2.52%; Aromatic Naphtha 48.4%; mineral oil 1.45%; isopropyl alcohol 1.50%.

Demulsifier

Heavy Aromatic Naphtha 61.00%, Ethoxylated p-nonyl Phenol Formaldehyde Resin 19.93%, Ethylene Glycol Mono-butyl Ether 9.85%, Oxyalkylated p-nonyl Phenol Formaldehyde Resin 5.02%, Xylene 3.5%, Sodium Naphthenate 0.57%, Naphthenic Acid 0.06%, Sodium Dodecylbenzene Sulfonate 0.03%, and $H_2O$ 0.04%.

The dilute whole oil/water admixtures were then fed through a mixing valve of the needle type and emulsified. The amounts of surfactant and demulsifier used, the amount of dilution of the whole oil with the diluent, the identity of the diluent, the gravity of the resultant raw shale oil, the amount of washwater used, and the differential pressure applied across the mixing valve are given in Table I-E for six series of runs. The emulsions were then fed into an electrostatic coalescer, or a series of two staged Howe Baker electrostatic coalescers, of conventional design. An alternating current field was employed at a potential of 4000 volts, with an electrode spacing of 3 inches. These treatments, as described in Table I-E, demonstrated excellent solids removal in Examples 1 and 2, even with oil gravities somewhat heavier than the anticipated commercial product. The results obtained in Example 3, which uses the heaviest oil feed, while somewhat less impressive was likewise successful. In all three of these runs, essentially no oil was lost with the water.

Examples 4–6 exemplify a series of treatments wherein diluted whole oil was treated as described with reference to Examples 1–3, and thereafter additional water was added to the once dedusted shale oil, and the once dedusted shale oil again similarly treated. Additional surfactant and demulsifier were not added for the second treatment because sufficient of these agents were present in the once treated shale oil. The raw shale oil used in this series had been stored under warm ambient temperature conditions, and for this reason presented a more difficult solids removal operation. Nonetheless, operation in accordance with the conditions described by Examples 4, 5, and 6 show excellent solids removal. Oil carryunder again was nil.

TABLE I-E

Treatment of Shale Oil for Solids Removal

| Example | Demulsifier/ Surfactant ppm Each | Feed Oil Whole Oil/ Distillate or Naphtha vol/vol | Gravity (Solids Free) °API | Washwater Vol % | Mixing Valve Pressure Drop psi | Oil Solids Content In Wt. % | From First Stage Wt % | From Second Stage Wt. % | Oil Carryunder |
|---|---|---|---|---|---|---|---|---|---|
| | | | | Single Treatment | | | | | |
| 1 | 60/15 | 50/50(1) | 24 | 10 | 5 | 4.4 | 0.03 | — | nil |
| 2 | 60/15 | 70/30(1) | 23 | 10 | 5 | 2.8 | 0.03 | — | nil |
| 3 | 60/15 | 90/10(1) | 22 | 10 | 5 | 10.2 | 0.12 | — | nil |
| | | | | Two Treatments in Series | | | | | |
| 4 | 120/30(3) | 70/30(2) | 26 | 10/5(4) | 5(5) | 2.9 | 0.12 | 0.07 | nil |
| 5 | 120/30(3) | 75/25(2) | 25 | 10/5(4) | 5(5) | 2.9 | 0.27 | 0.07 | nil |
| 6 | 120/30(3) | 80/20(2) | 24 | 10/5(4) | 5(5) | 3.9 | 0.30 | 0.10 | nil |

(1)Distillate as in Table I-C.
(2)Naphtha as in Table I-D.
(3)Added in first treatment only.
(4)10 vol. % water in first treatment, 5 vol. % water added in second treatment.
(5)Each treatment.

EXAMPLES 7-9

A further series of runs were conducted with a solids containing surface retorted raw shale oil produced from a Kerosene Creek Seam Australian oil shale. The shale oil feeds used were produced from a blend of pilot plant products to provide a shale oil product substantially similar to an oil produced commercially. The liquid product from the pilot plant was constituted of four fractions: heavy oil (H), middle oil (M), light oil (L), and gas naphtha (N) fractions. The term "total oil" is applied to the combined heavy, middle, and light oil fractions. The inspections for the total oil product (H+M+L) are given in Table II-A, and inspections of the gas naphtha product are given in Table II-B.

TABLE II-A

Analyses of Total Oil Product[1][2]

| Run No. | 7 | 8 | 9 |
|---|---|---|---|
| Mixing Ratio, Wt. % | | | |
| Heavy Oil | 26.0 | 29.1 | 26.1 |
| Middle Oil | 19.1 | 27.1 | 29.3 |
| Light Oil | 54.9 | 43.8 | 44.6 |
| Density, g/ml (15° C.) | | | |
| Heavy Oil | 0.945 | 0.962 | 0.971 |
| Middle Oil | 0.924 | 0.907 | 0.914 |
| Light Oil | 0.835 | 0.839 | 0.841 |
| Total Oil | 0.875 | 0.886 | 0.889 |
| Ultimate Analyses | | | |
| C, Wt. % | 85.49 | 85.59 | 85.68 |
| H, Wt. % | 11.49 | 11.25 | 11.26 |
| N, Wt. % | 1.06 | 1.10 | 1.07 |
| O, Wt. % | 1.37 | 1.44 | 1.40 |
| S, Wt. % | 0.59 | 0.62 | 0.59 |
| Density, g/ml (15° C.) | 0.876 | 0.889 | 0.891 |
| Viscosity, $10^6$ m$^2$/sec | | | |
| 20° C. | 4.267 | 8.903 | 6.919 |
| 40° C. | 2.733 | 4.846 | 3.625 |
| 50° C. | 2.263 | 3.668 | 3.261 |
| Pour Point, °C. | +18 | +21 | +18 |
| Conradson Carbon, Wt. % | 2.43 | 2.78 | 2.67 |
| Moisture, Wt. % | 0.117 | 0.086 | 0.079 |
| Distillation, °C. | | | |
| IBP | | 24 | 31 |
| 5% | | 95 | 107 |
| 10 | | 105 | 133 |
| 20 | | 154 | 174 |
| 30 | | 186 | 205 |
| 40 | | 222 | 271 |
| 50 | | 260 | 306 |
| 60 | | 304 | 334 |
| 70 | | 346 | 403 |
| 80 | | 443 | 455 |
| 90 | | 508 | — |
| FBP | | 520 | 550 |
| Residue, Vol. % | | 9 | 13 |

[1]Composite of heavy, middle and light oil in production ratio. Dust free basis.
[2]Associated gas naphtha product (Table II-B) is 0.124 weight percent naphtha per weight total oil from run No. 7, 0.119 for run No. 8, and 0.131 for run No. 9. Combined total oil and gas naphtha constituted the produced C$_5^+$ fraction.

TABLE II-B

Analyses of Gas Naphtha Product[1]

| Run No. | 7 | 8 | 9 |
|---|---|---|---|
| Density, g/ml (15° C.) | 0.706 | 0.714 | 0.716 |
| Ultimate Analyses | | | |
| C, Wt. % | 86.03 | 86.02 | 86.06 |
| H, Wt. % | 13.34 | 13.19 | 13.23 |
| N, Wt. % | <0.20 | <0.20 | <0.20 |
| O, Wt. % | 0.23 | 0.41 | 0.38 |
| S, Wt. % | 0.35 | 0.33 | 0.28 |
| Distillation, °C. | | | |
| IBP | 27 | 29 | 28 |
| 10% | 31 | 35 | 33 |
| 20 | 46 | 50 | 49 |
| 30 | 53 | 57 | 58 |
| 40 | 60 | 64 | 65 |
| 50 | 66 | 70 | 74 |
| 60 | 73 | 78 | 78 |
| 70 | 81 | 86 | 86 |
| 80 | 92 | 96 | 96 |
| 90 | 110 | 113 | 113 |
| FBP | 143 | 146 | 143 |
| Residue, Vol. % | 1 | 1 | 1 |
| Loss, Vol. % | 8 | 6.5 | 7.5 |
| Bromine No., g/100 g | | | 160 |
| Acid No., mg KOH/g | | | 0.23 |
| Group Analysis | | | |
| Aromatics, Vol. % | | | 17.5 |
| Olefins, Vol. % | | | 68.5 |
| Saturates, Vol. % | | | 14.0 |

[1]Water content of 200 to 600 ppm as determined by Karl-Fischer method.

A series of bottle tests were conducted using the product characterized in Table II-A under Run 7 as feeds to demonstrate the effectiveness of an admixture of the surfactant and demulsifier used in Examples 1-6 to produce separation of the emulsified oil and transfer of the solids to the oil phase, and removal of oil from the water phase, and to show the effects of the feed oil composition (H+M+L). These tests, the results of which are given in Table III, consisted of blending the various oil fractions from the retorting pilot plant at different pH levels, adding (for comparative purposes) no surfactant or demulsifier, adding either 3000 ppm of an admixture of the disclosed surfactant and demulsifier, adding either 15 or 30 vol. % of water, mixing by hand shaking, and allowing the mixture to settle for 1.5 hour while maintaining a temperature of 150° F. At the end of the 1.5 hour settling period, each of the bottles were visually examined for the separation of the water phase from the oil phase and transfer of solids to the water phase. The results as given in Table III (Column 3) show the excellent results obtained when the disclosed admixture of surfactant and demulsifier is used in an oil corrsponding to a whole liquid product which includes (H+L+M+N). The performance of the admixture of surfactant and demulsifier, as will be observed, was excellent over a range of wash water pH values of 4 to 11. Laboratory tap water was used with pH adjustment by either HCl or NaOH addition.

TABLE III

Demonstration of Performance of Admixtures of Surfactant and Demulsifier in Bottle Tests

| | Oil Composition | |
|---|---|---|
| | Production Ratio H + M + L 4.6 Wt. % Solids | Production Ratio H + M + L + N 4.1 Wt. % Solids |
| Treatment | | |
| No surfactant or demulsifier plus | | |
| 15% water, pH 7 | no oil/water separation | no oil/water separation |
| 30% water, pH 7 | no oil/water separation | no oil/water separation |
| Disclosed surfactant (1 part) and demulsifier (4 parts) plus | | |
| 15% water | | |
| pH 4 | no oil/water separation | clean oil/water separa., solids in water |
| pH 7 | no oil/water separation | clean oil/water separa., solids in water |
| pH 11 | no oil/water separation | clean oil/water separa., solids in water |
| 30% water | | |
| pH 4 | no oil/water separation | excellent oil/water separation solids in water |
| pH 7 | partial oil/water separation | excellent oil/water separation solids in water |
| pH 11 | no oil/water separation | excellent oil/water separation solids in water |

In another test, the water washing/gravity settling step was also demonstrated on a complete liquid product oil sample (H, M, L, & N) characterized in Tables II-A and II-B under Run 8 containing 10.6 wt. % solids. The treatment consisted of admixing with the oil: 2000 ppm of the admixture of demulsifier and surfactant in 4:1 ratio with 25 vol.% of water. After 2 hours of settling at 150° F., the separated oil phase had a solids content of only 0.6 wt. %.

In another test, the complete process described by reference to FIG. 2 was demonstrated on a large specimen of oil taken from the pilot plant. The oil used was made up of heavy, middle, light oil, and gas naphtha in their production ratios as characterized in Tables II-A and II-B, under Run 9, the oil having a solids content of 5.5 wt. %.

The first step treatment consisted of mixing this oil in a tank maintained at 110° F. with 2000 ppm of the admixture of demulsifier and surfactant in 4:1 ratio, and 15 wt. % of water. After settling for 24 hours, the separated oil phase contained 0.7 wt. % solids and 0.2% water.

The second step treatment consisted of mixing the oil from the first step with an additional 30 ppm of the disclosed admixture of surfactant and demulsifier and 5 vol. % water, and emulsifying same by passing the admixture through a mixing valve set at 7 psi. The total admixture was then passed into an electrostatic coalescer (Howe Baker) of conventional design operated at 250° F. (other conditions as in Examples 1–6). The oil phase from the coalescer contained only 0.03 wt. % solids and 0.1 vol. % water. The water phase from the coalescer contained only solids, there being no oil present.

It is apparent that various modifications and changes can be made without departing the spirit and scope of the present invention.

Having described the invention, what is claimed is:

1. A process for dedusting oils characterized as unconventional whole heavy crudes, heavy petroleum crude fractions and residua, syncrudes, syncrude fractions, and syncrude residua, which contain finely divided solids, which comprises dispersing from about 10 parts to about 5000 parts, per million parts by volume of oil, of an admixture of surfactant and demulsifier within said oil, the surfactant being (I) an ester characterized as follows:

where $R_1$, $R_2$, $R_3$, and $R_4$ are selected from
(a) ethoxy or propoxy groups, or mixed ethoxy and propoxy groups, and
(b) the dehydroxylated residue of a fatty acid molecule, or moiety represented by the formula where
$R$ is a straight-chain hydrocarbon moiety which can be substituted or unsubstituted, saturated or unsaturated, and where unsaturated can contain conjugated or unconjugated double bonds, and at least one and up to three of $R_1$, $R_2$, $R_3$, and $R_4$ is ethoxy, propoxy, or mixed ethoxy and propoxy groups, the demulsifier being (II) an ethoxylated or propoxylated, or admixed ethoxylated/propoxylated, phenol formaldehyde resin substituted at a position para to the ethoxy or propoxy group, or mixed ethoxy/propoxy groups, by a hydrocarbyl group, said modified phenol formaldehyde resin being characterized as follows:

wherein
$R_7$ represents one or more ethoxy or propoxy groups, or mixed ethoxy and propoxy groups,
$R_8$ is a hydrocarbyl radical selected from the group consisting of alkyl, aralkyl, cycloalkyl, aryl, alkaryl, alkenyl, and alkynyl, and
m is an integer of one or greater, the molecular weight of said resin ranging from about 2000 to about 20,000;
the ratio of demulsifier:surfactant ranging from about 1:1 to about 15:1, based on the sum total volume of the demulsifier and surfactant,
admixing washwater in concentration ranging from about 5 percent to about 50 percent, based on the volume of oil, with said surfactant/demulsifier-containing oil, and emulsifying same to form an oil and water emulsion,
separating said oil and water emulsion into an oil phase overflow, and solids-containing water phase underflow, and
recovering an oil phase of reduced solids suitable as a feed for use in refining operations.

2. The process of claim 1 wherein the surfactant and demulsifier are added to the oil in concentration ranging from about 30 ppm to about 80 ppm.

3. The process of claim 1 wherein the ratio of demulsifier:surfactant ranges from about 2:1 to about 4:1.

4. The process of claim 1 wherein the water and oil are admixed in concentration ranging from about 10 percent to about 30 percent, based on the volume of oil.

5. The process of claim 1 wherein the surfactant-/demulsifier-containing oil and water emulsion is separated into a clean oil phase overflow and solids-containing water underflow in an electrostatic coalescer.

6. The process of claim 1 wherein the admixture of surfactant and demulsifier also contains, as a portion of the surfactant an aromatic monosulfonic acid, or admixture of such acids, having the formula wherein $R_5$ is a hydrocarbyl radical selected from the group consisting of alkyl, aralkyl, cycloalkyl, aryl, alkaryl, alkenyl, and alkynyl.

7. The process of claim 6 wherein, in the molecular species constituting the aromatic monosulfonic acid, $R_5$ is alkyl, polyalkyl, alkoxy, alkylthio, or a polyalkoxy ether radical.

8. The process of claim 1 wherein the admixture of surfactant and demulsifier also contains, as a portion of the surfactant an ammonium ion substituted, substituted ammonium ion substituted, or alkali metal substituted sulfonate characterized by the formula wherein
M is an ammonium ion, substituted ammonium ion, or metal selected from Group I-A of the Periodic Table of the Elements, and
$R_6$ is a hydrocarbyl radical selected from the group consisting of alkyl, aralkyl, cycloalkyl, aryl, alkaryl, alkenyl, and alkynyl.

9. The process of claim 8 wherein M of the formula characterizing said compound is sodium.

10. The process of claim 9 wherein $R_6$ of the formula characterizing said compound is alkyl, polyalkyl, alkoxy, alkylthio, polyalkoxy ether or the like.

11. The process of claim 1 wherein at least one and up to three of $R_1$, $R_2$, $R_3$ and $R_4$ of the ester is the dehydroxylated residue of the fatty acid molecule represented by the formula 12. The process of claim 1 wherein the molecular species which comprises the ester is an admixture of compounds, and the molecular average of the admixture contains about three of the ethoxy, propoxy or mixed ethoxy and propoxy groups, and about one fatty acid group.

13. The process of claim 1 wherein, in an individual $R_1$, $R_2$, $R_3$ and $R_4$ group of the molecular species constituting the ester, the number of ethoxy, propoxy or mixed ethoxy and propoxy groups ranges from 1 to about 50.

14. The process of claim 1 wherein, in an individual $R_1$, $R_2$, $R_3$ and $R_4$ group of the molecular species constituting the ester, the number of ethoxy, propoxy or mixed ethoxy and propoxy groups ranges from about 2 to about 10.

15. The process of claim 14 wherein, in the molecular species constituting the ester, the sum total of the ethoxy, propoxy or mixed ethoxy/propoxy groups within the molecule ranges from about 5 to about 50.

16. The process of claim 1 wherein, in the molecular species constituting the ester, the sum total of the ethoxy, propoxy or mixed ethoxy/propoxy groups within the molecule ranges from about 10 to about 30.

17. The process of claim 1 wherein, in an individual $R_1$, $R_2$, $R_3$ and $R_4$ group of the molecular species constituting the ester, the number of ethoxy, propoxy or mixed ethoxy and propoxy groups within the molecule ranges from about 1 to 50, and wherein, in the molecule, the sum total of the ethoxy, propoxy or mixed ethoxy and propoxy groups ranges for about 5 to about 50.

18. The process of claim 1 wherein, in an individual $R_1$, $R_2$, $R_3$ and $R_4$ group of the molecular species constituting the ester, the number of ethoxy, propoxy or mixed ethoxy and propoxy groups ranges from about 2 to about 10, and wherein in the molecule the sum total of the ethoxy, propoxy or mixed ethoxy/propoxy groups ranges from about 10 to about 30.

19. The process of claim 1 wherein the phenol formaldehyde resin is of molecular weight ranging from about 5000 to about 10,000.

20. A process for dedusting shale oil which contains a low to moderate amount of finely divided solids which comprises
dispersing from about 10 parts to about 5000 parts, per million parts by volume of oil of an admixture of surfactant and demulsifier within said oil, the surfactant being
(I) an ester characterized as follows:

where $R_1$, $R_2$, $R_3$, and $R_4$ are selected from
(a) ethoxy or propoxy groups, or mixed ethoxy and propoxy groups, and
(b) the dehydroxylated residue of a fatty acid molecule, or moiety represented by the formula where R is a straight-chain hydrocarbon moiety which can be substituted or unsubstituted, saturated or unsaturated, and where unsaturated can contain conjugated or unconjugated double bonds, and
at least one and up to three of $R_1$, $R_2$, $R_3$, and $R_4$ is ethoxy, propoxy, or mixed ethoxy and propoxy groups,
the demulsifier being
(II) an ethoxylated or propoxylated, or admixed ethoxylated/propoxylated, phenol formaldehyde resin substituted at a position para to the ethoxy or propoxy group, or mixed ethoxy/propoxy groups, by a hydrocarbyl group, said modified phenol formaldehyde resin being characterized as follows:

wherein

R7 represents one or more ethoxy or propoxy groups, or mixed ethoxy and propoxy groups, R8 is a hydrocarbyl radical selected from the group consisting of alkyl, aralkyl, cycloalkyl, aryl, alkaryl, alkenyl, and alkynyl, and m is an integer of one or greater, the molecular weight of said resin ranging from about 2000 to about 20,000;

the ratio of demulsifier:surfactant ranging from about 1:1 to about 15:1, based on the sum total volume of the demulsifier and surfactant, admixing washwater in concentration ranging from about 5 percent to about 50 percent, based on the volume of oil, with said surfactant/demulsifier-containing shale oil, and emulsifying same to form a shale oil and water emulsion, heating said shale oil and water emulsion to a temperature ranging from about 100° F. to about 350° F. by passage through a heat exchanger, passing said heat shale oil/water emulsion to an electrostatic coalescer, maintaining a temperature within the electrostatic coalescer ranging from about 100° F. to about 350° F. and a residence time ranging from about 10 minutes to about 80 minutes, to separate said shale oil/water emulsion into a clean shale oil overflow and solids-containing water phase underflow, and recovering a clean shale oil suitable as a feed for use in refining operations.

21. The process of claim 20 wherein the admixture of surfactant and demulsifier also contains an aromatic monosulfonic acid, or admixture of such acids, having the formula wherein $R_5$ is a hydrocarbyl radical selected from the group consisting of alkyl, aralkyl, cycloalkyl, aryl, alkaryl, alkenyl, and alkynyl.

22. The process of claim 21 wherein, in the molecular species constituting the aromatic monosulfonic acid, $R_5$ is alkyl, polyalkyl, alkoxy, alkylthio, or a polyalkoxy ether radical.

23. The process of claim 20 wherein the admixture of additionally contains, as a portion of the surfactant an an ammonium ion substituted, substituted ammonium ion substituted, or alkali metal substituted sulfonate characterized by the formula wherein M is an ammonium ion, substituted ammonium ion, or metal selected from Group I-A of the Periodic Table of the Elements, and $R_6$ is a hydrocarbyl radical selected from the group consisting of alkyl, aralkyl, cycloalkyl, aryl, alkaryl, alkenyl, and alkynyl.

24. The process of claim 23 wherein M of the formula characterizing said compound is sodium.

25. The process of claim 24 wherein $R_6$ of the formula characterizing said compound is alkyl, polyalkyl, alkoxy, alkylthio, polyalkoxy ether or the like.

26. The process of claim 20 wherein at least one and up to three of $R_1$, $R_2$, $R_3$ and $R_4$ of the ester is the dehydroxylated residue of the fatty acid molecule represented by the formula 27. The process of claim 20 wherein the molecular species which comprises the ester is an admixture of compounds, and the molecular average of the admixture contains about three of the ethoxy, propoxy or mixed ethoxy and propoxy groups, and about one fatty acid group.

28. The process of claim 20 wherein, in an individual $R_1$, $R_2$, $R_3$ and $R_4$ group of the molecular species constituting the ester, the number of ethoxy, propoxy or mixed ethoxy and propoxy groups ranges from 1 to about 50.

29. The process of claim 20 wherein, in an individual $R_1$, $R_2$, $R_3$ and $R_4$ group of the molecular species constituting the ester, the number of ethoxy, propoxy or mixed ethoxy and propoxy groups ranges from about 2 to about 10.

30. The process of claim 29 wherein, in the molecular species constituting the ester, the sum total of the ethoxy, propoxy or mixed ethoxy/propoxy groups within the molecule ranges from about 5 to about 50.

31. The process of claim 20 wherein, in the molecular species constituting the ester, the sum total of the ethoxy, propoxy or mixed ethoxy/propoxy groups within the molecule ranges from about 10 to about 30.

32. The process of claim 20 wherein, in an individual $R_1$, $R_2$, $R_3$ and $R_4$ group of the molecular species constituting the ester, the number of ethoxy, propoxy or mixed ethoxy and propoxy groups within the molecule ranges from about 1 to about 50, and wherein, in the molecule, the sum total of the ethoxy, propoxy or mixed ethoxy and propoxy groups ranges for about 5 to about 50.

33. The process of claim 20 wherein, in an individual $R_1$, $R_2$, $R_3$ and $R_4$ group of the molecular species constituting the ester, the number of ethoxy, propoxy or mixed ethoxy and propoxy groups ranges from about 2 to about 10, and wherein in the molecule the sum total of the ethoxy, propoxy or mixed ethoxy/propoxy groups ranges from about 10 to about 30.

34. The process of claim 20 wherein the phenol formaldehyde resin is of molecular weight ranging from about 5000 to about 10,000.

35. The process of claim 20 wherein the surfactant and demulsifier are added to the oil in concentration ranging from about 30 vppm to about 80 vppm.

36. The process of claim 20 wherein the ratio of demulsifier:surfactant ranges from about 2:1 to about 4:1.

37. The process of claim 20 wherein the water and oil are admixed in concentration ranging from about 10 percent to about 30 percent, based on the volume of oil.

38. The process of claim 20 wherein the surfactant/demulsifier-containing oil and water emulsion is separated into a clean oil phase overflow and solids-containing water underflow in an electrostatic coalescer.

39. The process of claim 20 wherein the surfactant-/demulsifier-containing oil, and washwater admixed therewith are emulsified by passage through a mix valve.

40. The process of claim 39 wherein the differential pressure across the mix valve ranges from about 3 psi to about 30 psi.

41. The process of claim 20 wherein the surfactant-/demulsifier-containing oil and from about 5 percent to about 90 percent of the required washwater are admixed, passed through a heat exchanger and heated to a temperature ranging from about 100° F. to about 350° F., the balance of the required washwater added downstream of said heat exchanger, the total admixture which contains from about 20 ppm to about 300 ppm of the admixture of surfactant and demulsifier, based on the volume of oil, then sheared and emulsified by passage through a mix valve, the emulsion passed into an electrostatic coalescer and maintained therein at a temperature ranging from about 100° F. to about 350° F. for a period of from about 10 minutes to about 80 minutes wherein the emulsion is separated into a clean oil phase overflow and a solids-containing water underflow.

* * * * *